Jan. 29, 1929.  1,700,455

A. J. SILVA

HAY LOADING MACHINE

Filed April 4, 1927  2 Sheets-Sheet 2

INVENTOR

A. J. Silva

BY

ATTORNEY

Patented Jan. 29, 1929.

1,700,455

UNITED STATES PATENT OFFICE.

ANTONE J. SILVA, OF MILTON, CALIFORNIA.

HAY-LOADING MACHINE.

Application filed April 4, 1927. Serial No. 180,757.

This invention relates to improvements in agricultural implements, and particularly to a machine for gathering hay from the ground and loading it onto a wagon.

The principal object of my invention is to provide an apparatus for the purpose arranged to be drawn across the hay field by means of which the shocks of hay lying on the ground will be successively gathered up and immediately raised so that they may be discharged into a wagon moving alongside the loading machine. The gathering and raising device may be then held raised or at once caused to reassume its normal position adjacent the ground, as may be desired, ready to engage the next shock. A single manually operated control lever is all that is necessary to cause the hay gathering member to thus function, and its release when the hay has been fully raised is accomplished in an automatic manner and without any attention on the part of the operator being necessary. By means of this device, therefore, hay gathering and loading operations are greatly facilitated and speeded up over present methods of operation.

These objects I accomplish by means of such structure and relative arrangement of parts as will fully appear by a perusal of the following specifications and claims.

In the drawings similar characters of reference indicate corresponding parts in the several views:

Fig. 4 is a fragmentary view showing the control members of the operating mechanism just prior to their release.

Figure 1:
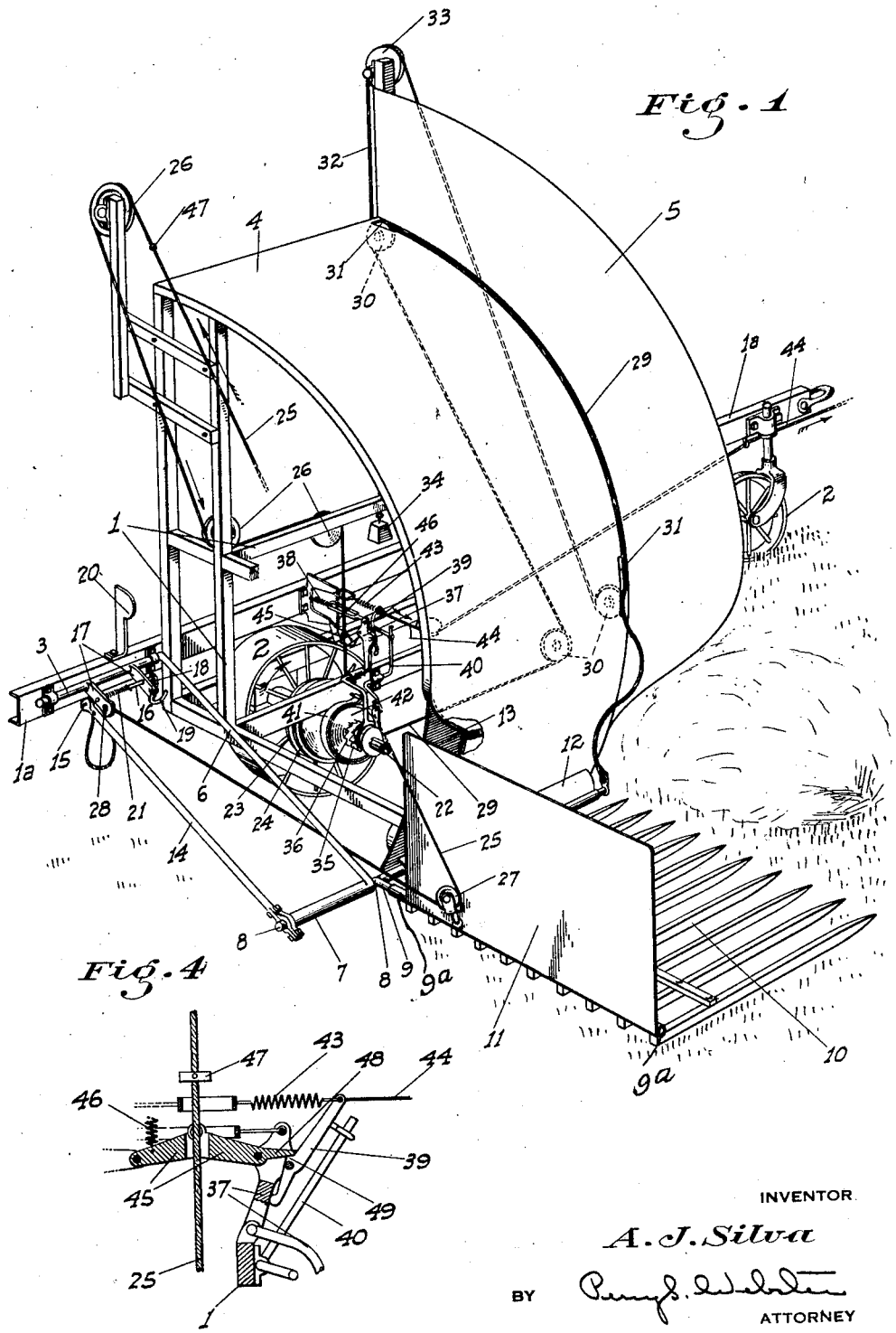
Fig. 1 is a perspective elevation of my improved hay loading machine partly broken out and showing the hay gathering member in position to engage a shock.
Figure 2:
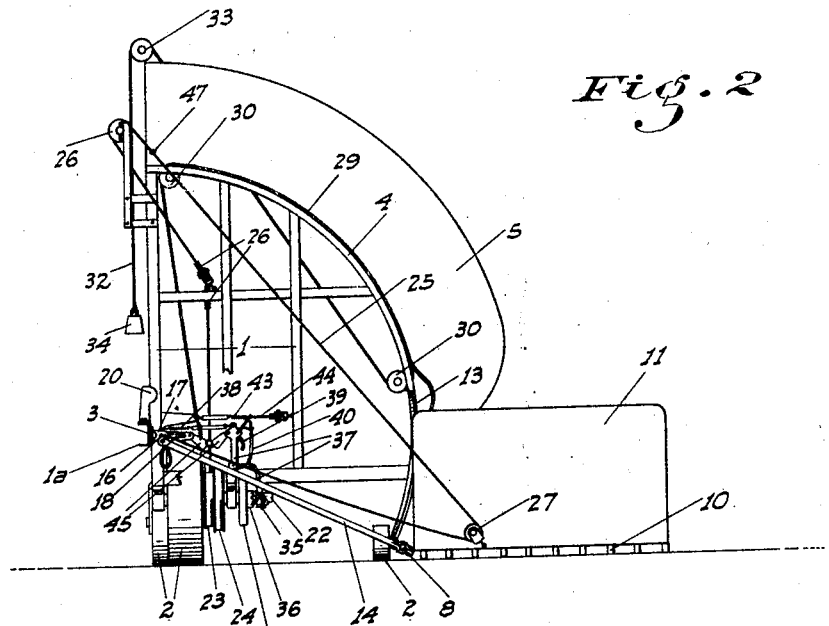
Fig. 2 is a rear end view of the structure with said gathering member adjacent the ground.

Referring now more particularly to the characters of reference on the drawings, the numeral 1 denotes a suitable framework supported from the ground at various points by wheels 2. The framework is adapted at its forward end to be attached to any suitable draft means. The framework includes a longitudinal side beam 1ª on the inner face of which is journaled a short shaft 3. Supported on the framework is a transverse apron 4 curved concentric with the shaft 3 and extending from adjacent the ground to an upper termination substantially in vertical alinement with the beam 1ª. A vertical flange 5 projects upwardly from the forward edge of the apron, said flange being cut away at the bottom as shown so as to avoid possible engagement with the hay on the ground.

Fixed on and projecting laterally from the shaft 3 (which is rearwardly of the apron) is an arm 6 which at its outer end terminates in a longitudinal and rearwardly extending sleeve 7 parallel to the shaft 3. The distance from said shaft to the sleeve is slightly greater than the radius of the apron. Turnable in and projecting through the sleeve is a shaft 8, from the end of which adjacent the apron a lateral and outwardly extending bar 9 projects. Turnably mounted on and projecting forwardly from the bar is a sleeve 9ª on which is mounted a hay pick-up unit comprising longitudinal and transversely spaced fingers 10. The outer ends of these fingers terminate in a longitudinal plane such that they will just clear the flange 5 rearwardly thereof. A back plate 11 is mounted in connection with the pick-up unit along the rear end thereof to ride against the rear edge of the apron. A small longitudinal apron 12 is mounted on said unit to bear against the face of the apron 4. The pick-up unit normally rests on the ground and on account of the double swivel supporting means 7—8 and 9—9ª above described it is free to tilt both longitudinally and transversely to follow any undulations in the ground. To prevent the back plate 11 binding against the back of the apron 4 when the unit is tilting forward, I cut out the lower rear portion of said apron and mount a spring pressed plate or shutter 13 under such cut-a-way portion. The back plate 11 bears against this shutter, which can yield when the plate moves forward so as to prevent possible damage to the apron or plate, while at the same time maintaining the apron as a solid fixed element throughout.

Fixed on and projecting laterally from the rear end of the shaft 8 in the direction opposite to the pick-up unit is an arm 14 extending to a point adjacent the beam 1ª and normally parallel to the arm 6. The free end of the arm 14 has a hole 15 therethrough to register with and receive a pin 16 which extends longitudinally over and parallel to the shaft 8 and is mounted in brackets 17 projecting radially from said shaft. At its end opposite to the arm 14 said pin is connected to an operating lever 18 pivoted on the adjacent bracket, said lever having a cam surface 19 adapted to engage a fixed lug 20 upstanding from the beam 1ª. This pin is normally held retracted from the hole 15 and the engagement of the cam surface 19 with said lug causes the pin to be advanced against the resistance of the spring and to enter the hole 15. Such engagement, however, only takes place when the arm 6 and the pick-up unit have been raised to a substantially vertical position for the purpose hereinafter seen.

The pick-up unit is arranged to be raised with the forward movement of the machine so as to cause the hay gathered by said unit with such movement to be raised up the apron and discharged over the top by means of the following structure:

Turnably mounted on the shaft 22 of the rearmost wheel 2 is a pair of transversely alined drums 23 and 24, connected together as a rigid unit. The cable 25 from the drum 23 leads over direction changing pulleys 26 (one of such pulleys being above the apron at the top and to the rear thereof); thence around a pulley 27 mounted on the pick-up unit back of the plate 11; then through an eye 28 in the bracket 17 nearest the arm 14 to a fixed connection with said arm in longitudinal alinement with the eye. When the pick-up unit rests on the ground the cable has a sufficient amount of slack to permit the necessary freedom of tilting movement of said unit and the concentric movement of the arm 14. The cable 29 from the drum 24 leads thence over direction changing pulleys 30 to a connection with the pick-up unit at the forward end thereof adjacent the apron. Certain ones of said pulleys are disposed adjacent the top and bottom of the apron respectively at the front thereof, said apron being slotted as at 31 so that the cable will pass over the apron between said pulleys as clearly shown in Fig. 1. This cable also normally has an amount of slack corresponding to that of the cable 25. Spliced onto the cable 29 at a suitable point in its length is another cable 32 which extends upwardly thence over a pulley 33 and terminates in a counter-weight 34. This cable and weight are arranged to exert a pull on the cable 29 in a direction opposite to the direction of the unit raising movement of said cable so as to impart an initial retractive movement to the cable after said unit has been raised and the cable has been released.

The drums are controlled by the following means:

Slidably keyed on the shaft 22 is a clutch element 35 adapted to engage a similar element 36 provided in connection with the drums. A clutch lever 37 is connected to the element 35 and is pivoted intermediate its ends in connection with the framework of the machine. The upper end of this lever is acted on by a spring 38 tending to pull the lever transversely to a clutch disengaging position. Pivoted intermediate its ends onto said lever intermediate the ends thereof is an arm 39 which is connected to another lever 40 pivoted onto the framework. This lever 40 in turn is connected to a brake band 41 associated with a brake drum 42 mounted in connection with the cable drums. A spring 43 is connected to the arm 39 so as to pull the lower end of the same away from the clutch lever and to cause the brake lever 40 to be maintained in a brake setting position. An operating cable 44 is connected to the arm 39 to pull the same against the pressure of the spring and extends thence to the forward end of the machine so that it can be manipulated by the operator at or ahead of the front end of the machine.

Pivoted at one end onto the lever 37 and at its other end in connection with the framework is a downwardly breaking transversely disposed knuckle member 45 through which the cable 25 passes. A spring 46 acts on said member to raise the same to a locking position slightly above dead-center, but the action of the spring is normally offset and overcome by the combined action of the springs 38 and 43, so that said member is normally broken down. At a suitable point in its length the cable 25 has a stop member 47 fixed thereon which is incapable of passing through the knuckle member.

Figure 3:
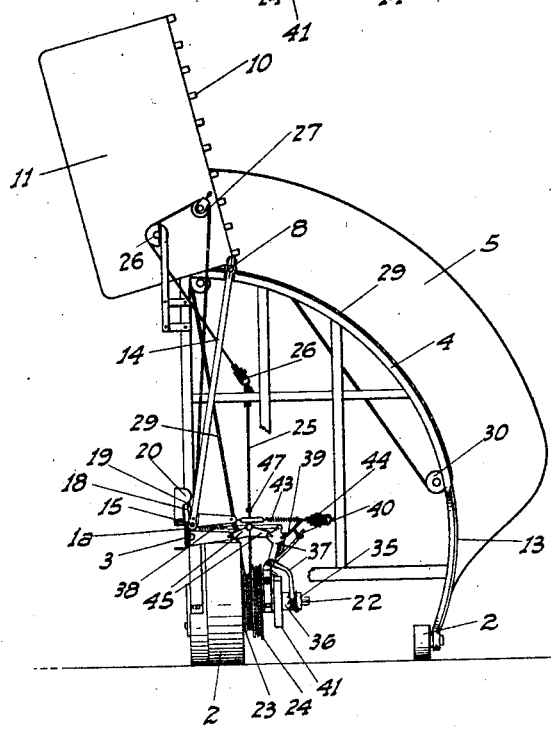
Fig. 3 is a similar view showing the gathering member in a raised position and just prior to the automatic release of the operating mechanism.

In operation assuming that the pick-up unit has engaged a shock of hay and it is desired to raise such hay the operator pulls on the cable 44. The initial pull on the cable imparts a movement to the arm 39 without moving the clutch lever 37. Such movement however is transmitted to the brake lever 40 and the brakes are released. As soon as the lower end of the arm 39 engages the clutch lever, a further pull on the cable 44 causes the arm and said lever to move as a unit. The clutch lever will be then thrown in causing the drums to revolve and the cables to be wound thereon. With such movement of the clutch lever however the knuckle member 45 becomes straightened up until, as the lever reaches its full clutch engaging position, said knuckle member assumes a locked or non-breaking position as shown in Fig. 3. At the same time an extension 48 on that portion of the unit 45 which is pivoted onto the lever 37, engages an offset or shoulder 49 on the brake arm 39 above its pivot, preventing the upper portion of said arm from moving toward lever 37, and holding the lever 40 in its brake releasing position. The cable 44 may then be released, since the locked knuckle prevents the springs 38 and 43 from functioning to retract the clutch lever and parts associated therewith. The brake will therefore remain released and the drums will remain in driving engagement with the wheel shaft.

The initial winding up of the cables on the drums causes the slack to be taken up before any raising movement is imparted to the pick-up unit. When the slack 6 is thus taken up the arm 14 is held rigidly against the adjacent bracket 17, with the hole 15 in line with the pin 16. A further winding of the cables on the drums causes the pick-up unit to be raised on the apron, the difference in diameter of the drums counteracting the difference in length of travel of the cables. The raising unit will therefore turn about the shaft 3 as an axis and while moving up the apron it will of course retain a substantially radial position relative thereto. The hay initially gathered by the pick-up unit will therefore be pushed up the apron by said unit and will be ahead of the same. As soon as the pick-up unit assumes a substantially vertical position the cam surface 19 of the member 18 engages the lug 20 and the pin 16 is forced into the hole 15 of the arm 14. This prevents the pick-up unit, to which the arm is connected, from possibly swinging forward out of control and about the sleeve 7 as an axis, since the shaft 8 on which said unit is mounted is free to turn in said sleeve as before stated.

With the movement of the unit to a raised position the stop 47 on the cable 25 moves downwardly toward the knuckle member, until as said unit reaches the top of the apron, said stop bears against the knuckle. Since the stop cannot pass through the knuckle it immediately breaks the same down. This causes the instant release of the clutch and an accompanying application of the brake, so that the unit will be held in its raised position. In order to then cause the unit to be lowered (which may be done at any time at the option of the operator), said operator again pulls the cable 44 but only sufficient to release the brake without moving the lever 37 and shifting the clutch. This permits the counter-weight to function and of course after the unit has been pulled down a short distance by such action of the counter-weight, the action of gravity on the unit will then act to lower said unit to the ground. All parts are then restored to their original positions and operations may then be repeated if necessary.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A hay loader including a frame structure to move along the ground, an apron mounted in connection with the frame and extending from adjacent the ground to a termination a predetermined distance above the ground, a longitudinally extending pick-up unit disposed outwardly of and in longitudinal alinement with the apron and normally positioned to pass under and engage a shock of hay on the ground, power means to raise the unit along and to the top of the apron, said means including a driven shaft, a drum turnable relative thereto, a cable from the drum to the unit, a clutch structure between the shaft and drum, a lever for the clutch, manual means for operating the lever to engage the clutch, means tending to move the lever to a clutch disengaging position, means for holding the lever in a clutch engaging position when said lever is manually operated to engage the clutch, said means comprising a double knuckle member arranged to break only in one direction and orificed to receive the cable therethrough, said member being pivoted at one end onto the lever and at the other end in non-movable relation to said lever, a spring acting on said member to move and hold the same in a rigid and non-broken position when the lever is moved to a clutch engaging position, and a stop on the cable to engage and break down the knuckle member when with the movement of said cable the unit has reached the top of the apron.

2. In a hay loader, a transversely extending arm pivoted at one end, a hay pick-up unit mounted in connection with and projecting outwardly from the other end of the arm for independent swinging movement in vertical planes both longitudinally and transversely when the unit is on the ground, means applied to the unit for raising the same and means functioning with the operation of said raising means for automatically preventing the pick-up unit from downward longitudinal swinging movement as soon as the same has been raised a predetermined distance clear of the ground.

3. In a hay loader, a transversely extending arm pivoted at one end, a sleeve mounted on the other end of the arm parallel to the axis of the pivot of the same, a shaft turnable in the sleeve, a transverse bar projecting outwardly from the shaft, a longitudinally extending hay pick-up unit turnably mounted at one end of said bar, and means for raising the unit and for then restraining its freedom of movement about the shaft and bar as axes without interfering with such movement when the unit is on the ground.

4. In a hay loader an arm, a pivot shaft for one end of the arm, a shaft turnably mounted on the outer end of the arm and parallel to said pivot shaft, a hay pick-up unit secured on and projecting outwardly from said second named shaft, the latter being free to turn when the unit is on the ground, means for raising the unit, an arm fixed on said last named shaft and extending thence substantially parallel to and in the same direction as said first named arm, a latch structure mounted on and projecting radially from the pivot shaft, said structure including a member to engage said last named arm adjacent its free end and means normally holding said member disengaged, and actuating means for said member to move the same into engagement with its arm arranged to function only when the pick-up unit has been raised to a predetermined height.

In testimony whereof I affix my signature.

ANTONE J. SILVA.